United States Patent [19]

Sato et al.

[11] Patent Number: 5,109,295
[45] Date of Patent: Apr. 28, 1992

[54] LIQUID CRYSTAL ELECTRO-OPTICAL DEVICE WHEREIN THE FERROELECTRIC LIQUID CRYSTAL LAYER DOES NOT FORM HELICES WHEN THE MOLECULES TAKE TWO STABLE STATES BUT FORM HELICES DURING THE INTERMEDIATE STATE

[75] Inventors: Masahiko Sato; Toshiji Hamatani, both of Atsugi; Toshimitsu Hagiwara, Yokohama; Hitoshi Kondou, Inagi, all of Japan

[73] Assignee: Semiconductor Energy Laboratory Co., Ltd., Kanagawa, Japan

[21] Appl. No.: 646,498

[22] Filed: Jan. 28, 1991

Related U.S. Application Data

[63] Continuation of Ser. No. 347,036, May 4, 1989, abandoned.

[30] Foreign Application Priority Data

| May 12, 1988 | [JP] | Japan | 63-115088 |
| May 12, 1988 | [JP] | Japan | 63-115089 |
| May 12, 1988 | [JP] | Japan | 63-115090 |
| May 26, 1988 | [JP] | Japan | 63-129784 |

[51] Int. Cl.$^5$ .............................. G02F 1/13
[52] U.S. Cl. .................... 359/100; 359/104; 252/299.01
[58] Field of Search .............. 350/350 S, 350 R, 340, 350/341; 252/299.01, 299.65, 299.66, 299.67

[56] References Cited

U.S. PATENT DOCUMENTS

| 4,367,924 | 1/1983 | Clark et al. | 350/350 S |
| 4,596,667 | 6/1986 | Inukai et al. | 252/299.65 |
| 4,647,398 | 3/1987 | Saito et al. | 350/350 S X |
| 4,676,925 | 6/1987 | Inoue et al. | 350/350 S X |
| 4,722,594 | 2/1988 | Crossland et al. | 350/350 S |
| 4,751,019 | 6/1988 | Saito et al. | 252/299.66 |
| 4,759,614 | 7/1988 | Yokokura et al. | 350/350 S |
| 4,759,869 | 7/1988 | Ohno et al. | 350/350 S X |
| 4,780,241 | 10/1988 | Furukawa et al. | 350/350 S X |
| 4,780,242 | 10/1988 | Miyazawa et al. | 350/350 S X |
| 4,783,148 | 11/1988 | Tsuboyama et al. | 350/341 |
| 4,799,775 | 1/1989 | Crossland et al. | 350/350 S |
| 4,820,444 | 4/1989 | Inukai et al. | 350/350 S X |
| 4,834,907 | 5/1989 | Inoue et al. | 350/350 S X |
| 4,844,835 | 7/1989 | Uchida et al. | 350/350 S X |
| 4,852,978 | 8/1989 | Davey et al. | 350/350 S X |
| 4,869,577 | 9/1989 | Masaki | 350/350 S |
| 4,882,207 | 11/1989 | Coates et al. | 350/340 |
| 4,902,106 | 2/1990 | Dijon et al. | 350/350 S |
| 5,013,479 | 5/1991 | Minai et al. | 252/299.65 |

FOREIGN PATENT DOCUMENTS

| 0283916 | of 1988 | European Pat. Off. |
| 0309774 | of 1989 | European Pat. Off. |
| 0060625 | 4/1985 | Japan | 350/350 S |
| 2192290 | of 1988 | United Kingdom |

OTHER PUBLICATIONS

Molecular crystals and liquid crystals, vol. 144, 1987 Gordon and Breach Science Publishers S.A. U.S.A., S. Kishio et al. "Hysteresis of Optical Transmission in Ferroelectric Liquid Crystals by Winding and Unwinding Motions of Helical Structure" pp. 43-56.

Primary Examiner—Stanley D. Miller
Assistant Examiner—Huy K. Mai
Attorney, Agent, or Firm—Sixbey, Friedman, Leedom & Ferguson

[57] ABSTRACT

A new type of non-volatile bistable liquid crystal device is disclosed. The device has substrates spaced apart by such a distance that the molecular arrangement of the liquid crystal moaterial is helical and is arranged such that the liquid crystal molecules can selectively take up either of two optically anisotropic stable conditions in dependence puon an applied electric field. The transition between the two stable conditions takes place via an intermediate conditon in which the liquid crystal molecules are reearranged in helical form and represent an optically isotropic condition.

11 Claims, 6 Drawing Sheets 1.2 msec

LIQUID CRYSTAL ELECTRO-OPTICAL DEVICE WHEREIN THE FERROELECTRIC LIQUID CRYSTAL LAYER DOES NOT FORM HELICES WHEN THE MOLECULES TAKE TWO STABLE STATES BUT FORM HELICES DURING THE INTERMEDIATE STATE

This application is a continuation of Ser. No. 07/347,036, filed May 4, 1989, now abandoned.

BACKGROUND OF THE INVENTION

The present invention relates to improved liquid crystal electro-optical devices, and more particularly relates to ferroelectric liquid crystal devices employing a new and improved driving mode.

Heretofore, it has been known to utilize twisted nematic liquid crystals in the derivation of electro-optical displays. The liquid crystal materials are employed in layer form and a number of pixels are defined in the liquid crystal layers by provision of a matrix electrode arrangement contiguous to the liquid crystal layer. However, due to the occurence of crosstalk between adjacent pixels during operation in a time multiplexed mode, the number of pixels that can be achieved per unit display area, i.e. the pixel density, is substantially limited.

Switching in such a display may be performed by means of thin film transistors provided for each other, such a driving arrangement being called an active matrix system. However, because of the complexities of the manufacturing process, it is very difficult to produce such a display with a large area and at the same time to obtain cost reduction.

In an attempt to solve the above shortcomings of prior art devices, Clark et al. have proposed a ferroelectric liquid crystal device in their U.S. Pat. No. 4,367,924 and FIG. 1 of the accompanying drawings is an explanatory schematic diagram showing the action of liquid crystal molecules in such a prior art device. A ferroelectric liquid crystal is interposed between a pair of glass substrates 11 and 11' each provided with an electrode arrangement made of $In_2O_3$, $SnO_2$ or ITO (Indium Tin Oxide) on the inner surface thereof. The liquid crystal material is arranged between the substrates so that each molecular layer 12 is normal to the substrates as illustrated in the figure. The operating phase of the liquid crystal material is chiral smectic C and desirably the material has this phase at room temperature. The liquid crystal molecules can adopt two stable positions I and II which inclined at angles $\theta$ and $-\theta$ to the layer normal as shown in FIG. 2.

The position of the molecules can be switched between these two stable positions in dependence upon an externally applied electric field directed normally to the substrates, and in this manner visual images can be constructed based on differential birefringence between pixels in different states. One feature of this type of display device is its bistablity which arises by virtue of that fact that the position of each liquid crystal molecule will be maintained even after the applied electric field has been removed and will remain so until another electric field is applied anew in the opposite sense. In other words, such display devices can function as non-volatile memory elements.

While this proposal of Clark et al. seems promising as regards the derivation of a new type of liquid crystal device capable of displaying non-volatile information at a high pixel density, there is a critical disadvantage from the viewpoint of production. The pair of glass substrates between which liquid crystal material is disposed have to be spaced apart from each other at such a small distance as to ensure unwinding of the helical liquid crystal molecules. The distance between the substrates thus has to be of the order of the pitch of the helix, e.g. few micrometer or thereabouts. The performance of liquid crystal devices of this type is thus very sensitive to the uniformity of the distance between substrates. For this reason, it is anticipated that it will be very difficult to ensure the uniformity of such a narrow gap in mass-production of such devices.

SUMMARY OF THE INVENTION

It is thus an object of the present invention to provide a liquid crystal device which is suitable for mass-production.

In order to accomplish the above and other objects it is proposed in accordance with the present invention to utilize a molecular arrangement of the liquid crystal material in which the molecules of the material are arranged in helical form and can take up two stable optical anisotropic conditions, as in the Clark et al device, but wherein the transition between the two stable conditions takes place via an intermediate state in which the crystal molecules are rearranged in helical form representing an optically isotropic condition. The distance between a pair of substrates between which the liquid crystal material layer contained is selected preferably to be about one order of magnitude more than the pitch of the molecular helix, and more preferably no less than five times the pitch for the purpose of ensuring the helical molecular arrangement. As may be seen from the following description of examples, however, dependent upon the conditions exceptions to the above can be constructed.

DETAILED DESCRIPTION OF THE PREFERRED EMBODIMENTS

Figure 3:
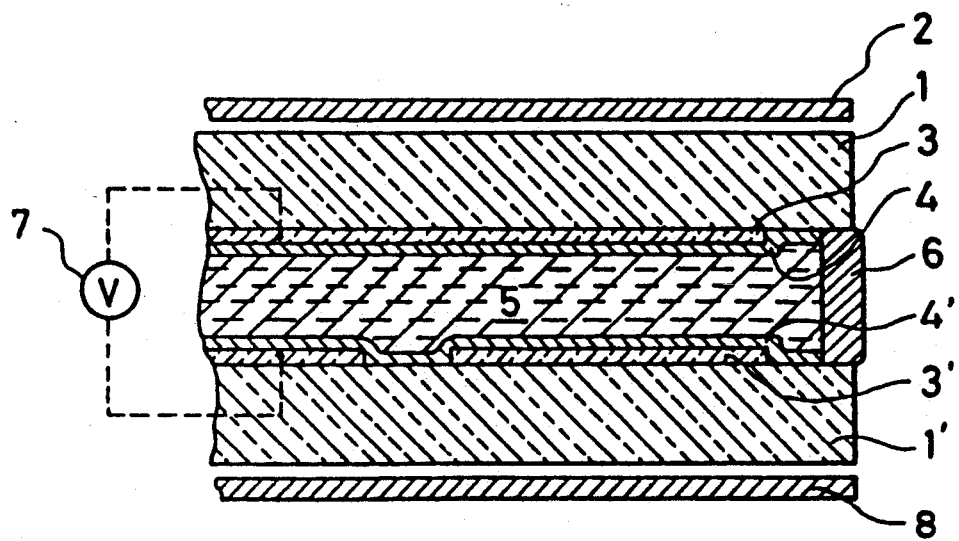
FIG. 3 is a cross sectional view of a liquid crystal device according to the present invention comprising a ferroelectric chiral smectic liquid crystal material.

Referring now to FIG. 3, a liquid crystal display device in accordance with the present invention is illustrated therein in cross sectional view. The device comprises a pair of glass substrates 1 and 1', a first plurality of parallel electrode strips 3 formed on the substrate 1 and extending in the lateral direction parallel to the place of the drawing sheet, a second plurality of parallel electrode strips 3' formed on the substrate 1' and extending in the direction normal to the plane of the drawing sheet, a first orientation control film 4 made of a polyimide resin, a second orientation control film 4' made of $SiO_2$, and a quantity of an ester ferroelectric liquid crystal material 5.

The orientation control films 4 and 4' are provided for aligning the molecules of the liquid crystal. Electric field can be impressed between the first and second electrode strips 3 and 3' by means of a voltage source 7. The ferroelectric liquid crystal material is a composite chiral smectic C phase liquid crystal. The combination of the first and second electrode strips 3 and 3' constitutes an electrode matrix defining a plurality of pixels. By appropriate selection of a suitable resin to form the orientation control films, it is possible to increase the relative threshold levels of the signals required to be applied to the liquid crystal layer for achieving switching. The first and second orientation control films 4 and 4' are given a rubbing treatment. A sealing member 6 is provided around the periphery of the substrates for avoiding loss of liquid crystal. Reference numerals 2 and 8 designate polarizing plates arranged in appropriate orientations.

The dimensions of the parts of the device shown in the figure are only chosen for illustration and are not in accordance with a real design. Although not shown in the figure, spacers, e.g. segments of glass fiber, are interposed between the substrates in order to maintain them spaced apart by a constant distance. In reality, the distance between the substrate may be 20 microns and the width of each electrode strip may be 0.36 mm and may be separated from adjacent strips by 0.04 mm intervals. Examples of practically suitable liquid crystal materials are those in which chiral smectic C phases appear within a temperature range the order of of $-10°$ C. to $+70°$ C. In accordance with experimental results, particularly suitable materials exhibit smectic A phases at the high temperature end of such temperature range.

In accordance with one examplary embodiment, a liquid crystal blend was utilized and included at least one liquid crystal material represented by the general formula:

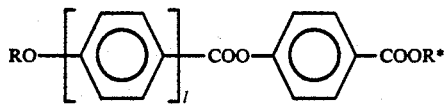

where R stands for an alkyl group comprised of 6–12 carbon constituent atoms; R* stands for an optically active group comprised of 9–15 carbon constituent atoms including at least one asymmetric carbon atom; and l is one or two. Examples of such materials are as follows.

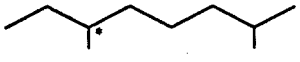

| Material | R | l | R* |
|---|---|---|---|
| A | $C_8H_{17}$ | 1 | |
| B | $C_{12}H_{25}$ | 1 | same as above |
| C | $C_{10}H_{21}$ | 2 | same as above |

By experiment, a blended liquid crystal containing all of the above liquid crystals materials A, B and C was prepared and the phase transformations of this blend were observed and found to be Iso ← (79° C.)→SmA←(64° C.)→SmC*←(0.3° C.)→Crystal. This blend was disposed between the substrates as illustrated in FIG. 3 and observed by use of a polarizing microscope at room temperature (23° C.). Stripes indicative of the existence of helices were confirmed. The helix pitch was about 2.8 micrometer. When the appearance of the liquid crystal through the microscope was continuously observed while rotating the stage of the microscope upon which the liquid crystal device was supported, there was found to be no particular position in which the observable light disappeared. Next, an electric field was applied to the liquid crystal by means of the electrodes 3 and 3'. The liquid crystal device was then found to have a particular orientation in which no light passed therethrough. This "dark condition" was maintained even after the removal of the electric field and until another electric field was applied in the reverse sense.

Figure 4:
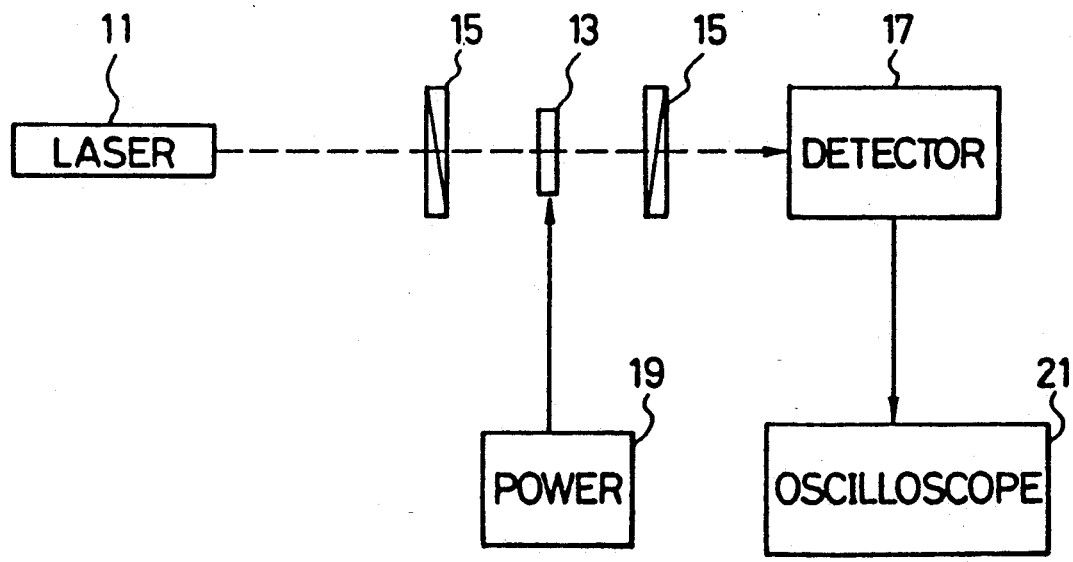
FIG. 4 is a schematic view showing a system for investigating the performance of a liquid crystal device in accordance with the present invention.

The intensity of light passing through the liquid crystal device was measured by means of a system as illustrated in FIG. 4. The system comprised a laser 11, a sample liquid crystal device 13 disposed between a pair of polarizing plates 15, and a photodetector 17. An input voltage was applied to the sample device from an electric power source 19 in order to subject the liquid crystal material disposed in the device to an electric field normal to the substrates. The intensity of light passing through the sample and through the polarizing plates was detected by the detector 17 and displayed by an oscilloscope 21. The input voltage applied to the device from the power source 19 was also displayed by the oscilloscope 21.

Figure 5A:
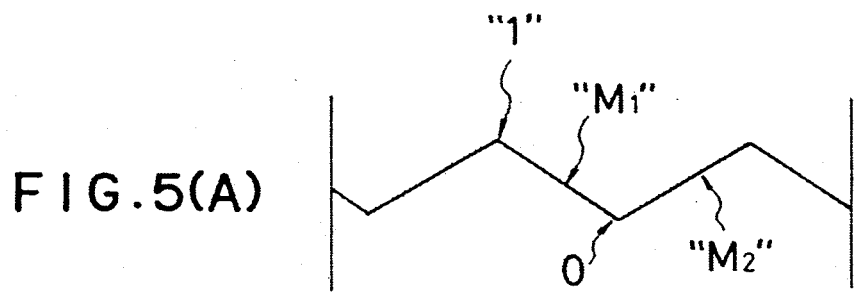
FIGS. 5(A) and 5(B) show a sawtooth voltage waveform inputted to a liquid crystal device according to the present invention and an output signal indicative of the transmissivity of the device that is received in response to the input signal.
Figure 5B:
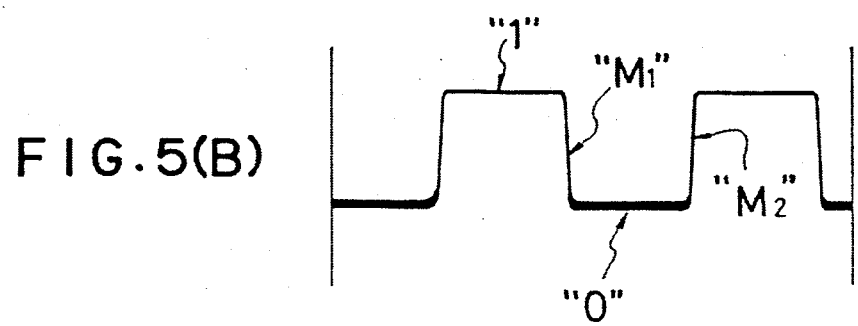
Figure 5C:
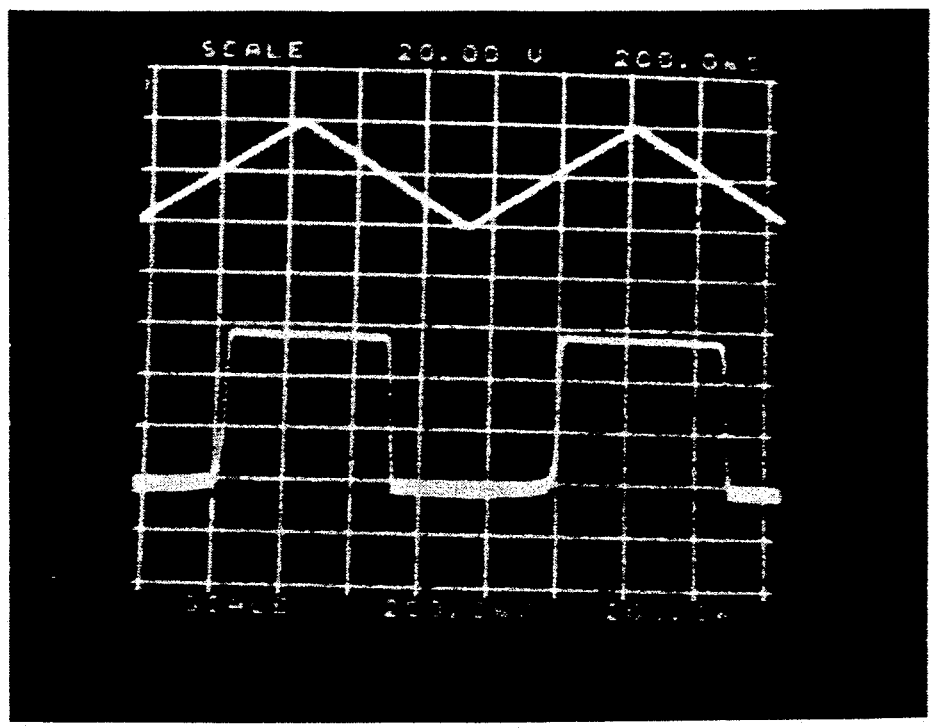
FIG. 5(C) shows a photograph of the CRT display of an oscilloscope investigating the performance of the device.
Figure 6A:
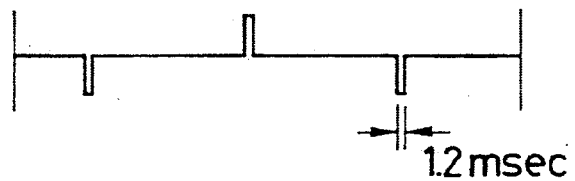
FIGS. 6(A) and 6(B) show a sequence of voltage pulses inputted to a liquid crystal device according to the invention and an output signal indicative of the transmissivity of the device that is received in response to the input signal.
Figure 6B:
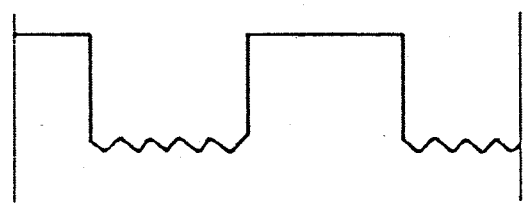
Figure 6C:
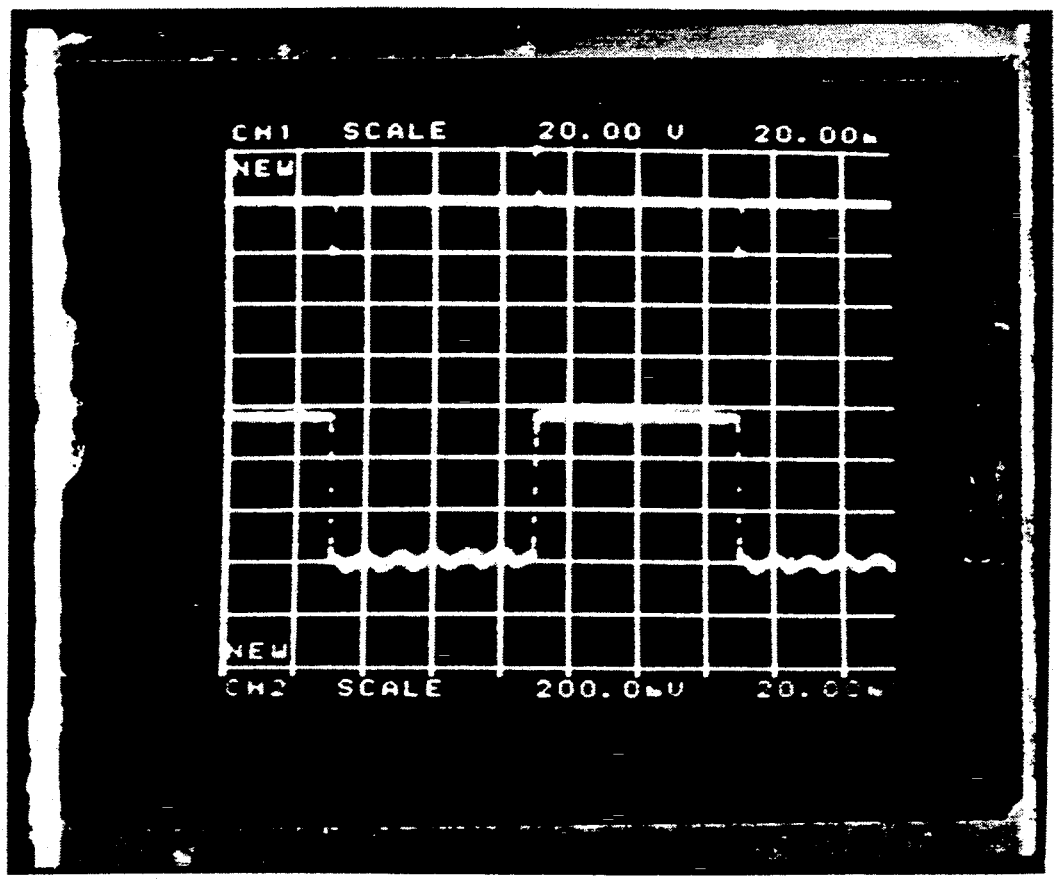
FIG. 6(C) shows a photographs of the CRT display of an oscilloscope investigating the performance of the device.

FIG. 5(A) shows an input voltage waveform (sawtooth) applied to the above device and FIG. 5(B) shows the intensity of light passing through the device. A corresponding photograph of the CRT display of the oscilloscope is shown in FIG. 5(C). Also, another input voltage form and the detected intensity responsive thereto are shown in FIGS. 6(A) and 6(B) as well as in the photograph in FIG. 6(C) when a sequence of pulses were applied to the device. These experiments were carried out at 25° C.

Figure 1:
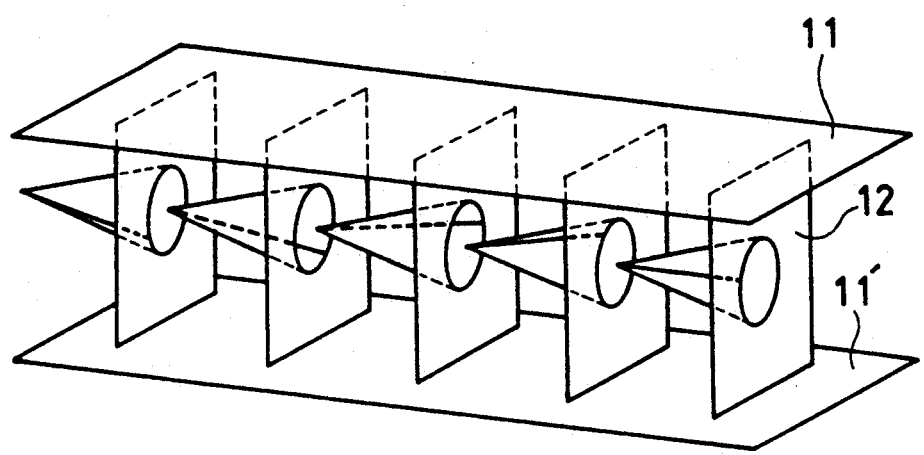
FIG. 1 is an explanatory view showing liquid crystal molecules interposed between substrates in a device of the aforementioned Clark et al type.
Figure 2:
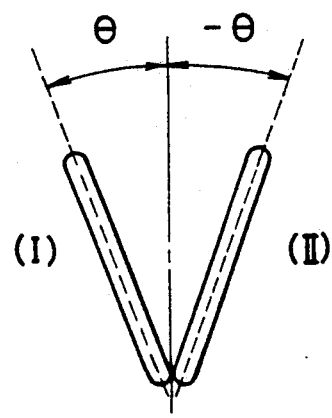
FIG. 2 is a schematic diagram showing two stable positions of a liquid crystal molecule in a Clark et al type display.
Figure 7A:
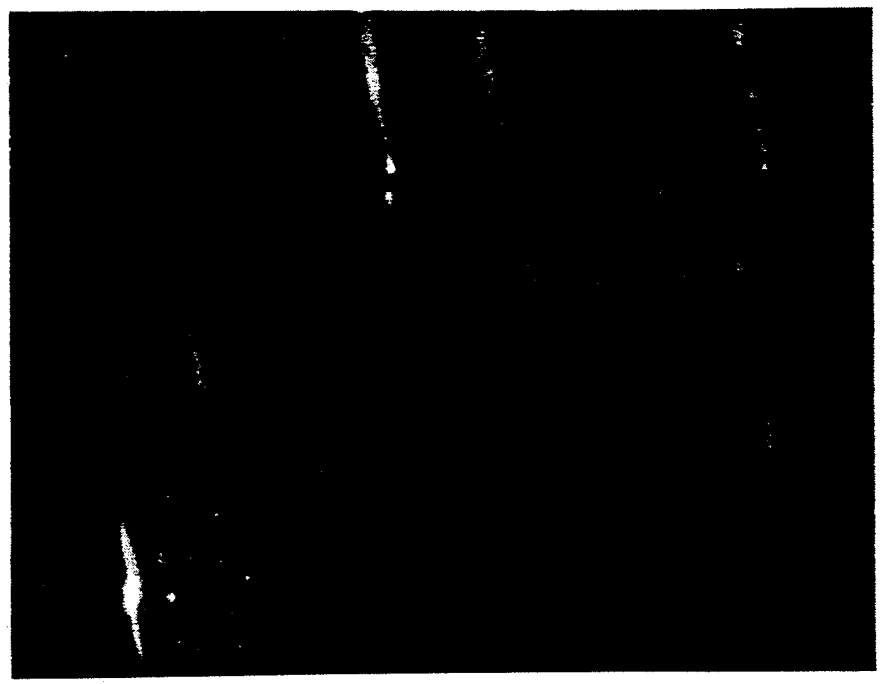
FIGS. 7(A), 7(B), 7(C) and 7(D) are microphotographs of the molecular arrangement of a liquid crystal material which illustrate the driving mode utilized in the practice of the present invention.
Figure 7B:
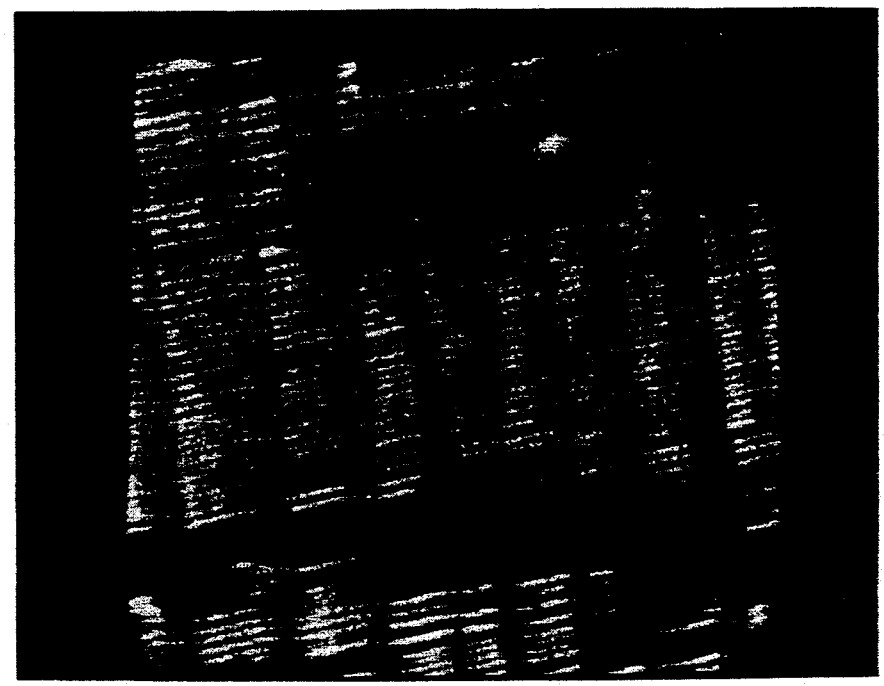
Figure 7C:
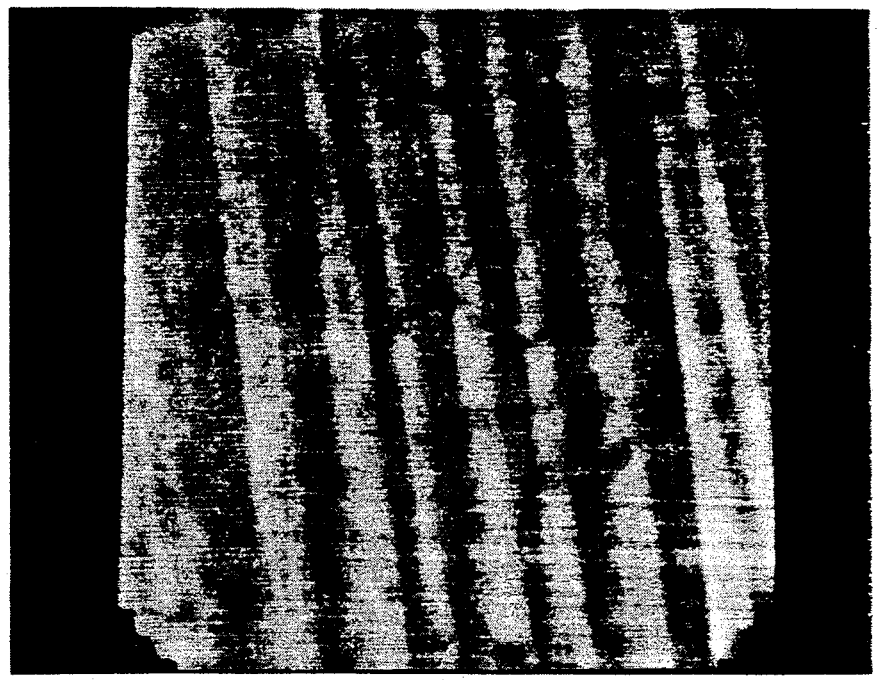
Figure 7D:
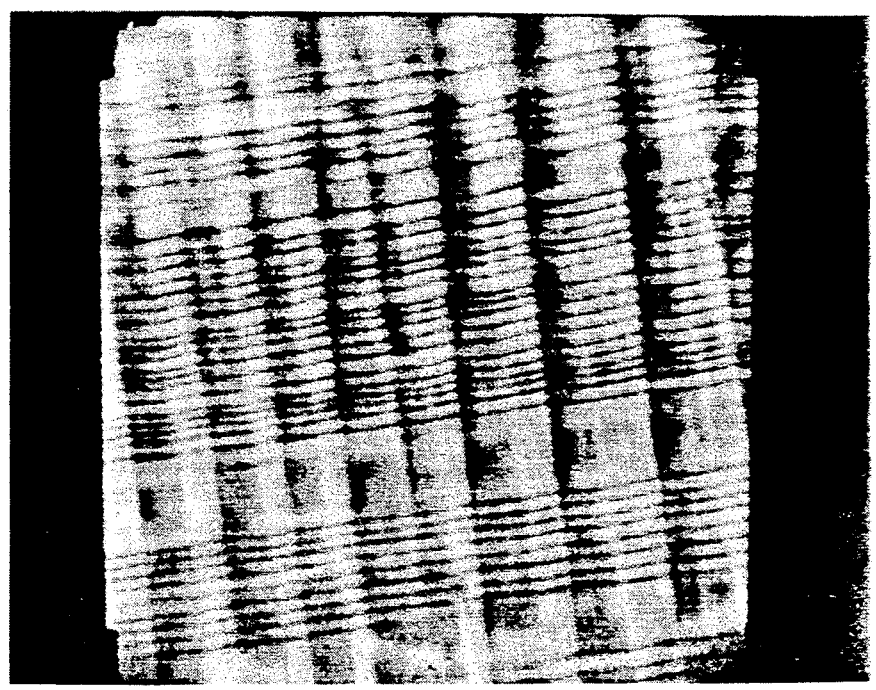

During switching operation as illustrated in FIG. 5, microphotographs were taken in order to show the arrangement of the liquid crystal molecules by way of illustration of the switching mode in accordance with the present invention. FIG. 7(A) shows the arrangement of the liquid crystal molecules when subjected to an electric field in one sense, corresponding to point "1" in FIGS. 5(A) and 5(B) and the condition of the liquid crystal molecules in this arrangement is called herein a "first position." FIG. 7(B) shows the arrangement of liquid crystal molecules without application of an electric field, corresponding to point "$M_1$" in FIGS. 5(A)

and 5(B). FIG. 7(C) shows the arrangement of the liquid crystal molecules when subjected to an electric field in the other sense, corresponding to point "0" in FIGS. 5(A) and 5(B) and the condition of the liquid crystal molecule in this arrangement is called herein a "second position." FIG. 7(D) shows the arrangement of the liquid crystal molecules when the strength of the input electric field again becomes zero, corresponding to point "M2" in FIGS. 5(A) and 5(B). As can be seen from FIGS. 7(A) to 7(D), the change of the arrangement of the liquid crystal materials between their first and second positions took place via an intermediate state ("M1" and "M2") in which the liquid crystal molecules took up helical forms (optically isotropic). In other words, FIGS. 7A and 7C correspond to conditions in which the liquid crystal molecules are in their two stable states, as shown by the substantially uniform microphotographs. FIGS. 7A and 7C differ only in polarity. In the intermediate states (FIGS. 7B and 7D) the liquid crystal layer forms helices. The intermediate conditions correspond to points M1 and M2 of FIG. 5A. In FIGS. 7B and 7D, the stripe pattern confirms the formation of helices, with each stripe corresponding to one helical pitch. Liquid crystal molecules which form one helix are also schematically illustrated in FIG. 1, with the condition of light passing through the device modified by virtue of the liquid crystal layer and since the liquid crystal layer forms helices, the condition of the light changes periodically as a result of the helices. Also, as can be seen from FIGS. 6(A) to 6(C), the first and second positions can be maintained even without the application of an external electric field. The contrast ratio in this case was measured to be 23.5, which is of the same order as may be obtained by use of conventional devices utilizing a ferroelectric liquid crystal material. The angle of visibility was also of the same order as for conventional devices.

The above experiment was repeated using similar liquid crystal devices except that the distances between the pair of substrates were 10, 20 and 50 micrometers respectively, the devices being called hereinbelow "sample 10," "sample 20" and "sample 50" for convenience. Just after disposing the liquid crystal material between the substrates, helices were observed in all of the three samples and when the samples were observed with a polarizing microscope it was found that there was no dark condition orientation of the samples in which light was not transmitted through the sample. The appearance of the helices in the sample 10 was unclear, however it was apparent from the absence of any dark condition orientation that the liquid crystal molecules were arranged in helical form.

Experiments were carried out at 25° C. with these samples in order to measure the contrast ratios. The input voltage pulses were those illustrated in FIG. 6(A) and were applied to the samples at 1 Hz. The pulsed voltage level was ±20 V, and the resulting ratios of the sample 10, the sample 20 and the sample 50 were measured to be 10.2, 22.7 and 9.3 respectively. The relatively low contrast ratio in the case of sample 10 is attributed to the influence of the contiguous inner surfaces of the substrates. The relatively low contrast ratio in the case of sample 50 was attributed to the displacement of smectic layers in the thickness direction.

Next, another embodiment of the invention will be described. The construction of the liquid crystal device in accordance with this embodiment is basically the same as for the above embodiment except for the distance between the pair of substrates and the composition of the blended liquid crystal material. The distance was selected to be 2.5 micrometers and the blend of liquid crystal materials included at least one liquid crystal materials represented by the general formula:

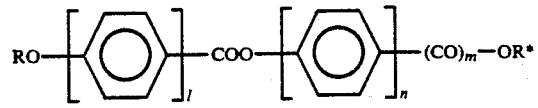

where R stands for an alkyl group comprised of 6-12 carbon constituent atoms; and R* stands for an optically active group comprised of 9-15 carbon constituent atoms including at least one asymmetric carbon atom. Examples of such material are as follows.

| Material | R | l n m | R* |
|---|---|---|---|
| D | $C_8H_{17}$ | 1 1 0 | |
| E | $C_9H_{19}$ | 1 1 1 | |
| F | $C_{12}H_{25}$ | 2 1 1 | |
| G | $C_{10}H_{21}$ | 2 1 1 | |

By experiment, a blended liquid crystal containing all of the above liquid crystals materials D, E, F and G was prepared. The phase transformation of this blend was observed and found to be Iso←(77° C.)→→SmA←(62° C.)→SmC*←(−8° C.)→Crystal. This blend was interposed between the substrates illustrated in FIG. 3 and observed by use of a polarizing microscope at room temperature (23° C.). Stripes indicative of the existence of helices were confirmed. The helix pitch was about 0.8 micrometer. Also in this embodiment, it was confirmed in the same manner as in the foregoing embodiment that there were two stable anisotropic condition in which the light transmissivity of the device was 0% and 90% respectively. The condition of the device could be changed between the two conditions at a response speed of 90 microseconds via an intermediate state in which the liquid crystal molecules were arranged in helical form. The contrast ratio was measured to be 31.1.

While several embodiments of the present invention have been specifically described, it is to be appreciated that the present invention is not limited to the particular examples described and that modifications and variations can be made without departure from the scope of the invention as defined by the appended claims. For example, other liquid crystal materials such as biphenyl-based or pyrimidine-based materials can be used in the practice the present invention.

We claim:

1. A liquid crystal electro-optical device comprising:
a pair of substrates spaced apart from each other;
an electrode arrangement formed on said pair of substrates; and a ferroelectric liquid crystal layer interposed between said substrates wherein molecules of said ferroelectric liquid crystal layer are capable of being switched between two stable states via an intermediate state in accordance with an electric field applied thereto, wherein said ferroelectric liquid crystal layer does not form helices when the molecules take said two stable states but forms helices during said intermediate state.

2. A liquid crystal electro-optical device as in claim 1, wherein opposite inner surfaces of said pair of substrates in contact with the liquid crystal layer are comprised of different materials.

3. A liquid crystal electro-optical device as in claim 2, wherein said opposite inner surfaces are comprised of polyimide and silicon oxide, respectively.

4. A liquid crystal electro-optical device as in claim 2, wherein said ferroelectric liquid crystal layer exhibits a chiral smectic C phase at operational temperatures.

5. A liquid crystal electro-optical device as in claim 4, wherein said smectic C phase appears at temperatures ranging from $-10°$ to $70°$ C.

6. A liquid crystal electro-optical device comprising:
a pair of substrates spaced apart from each other by a predetermined distance;
an electrode arrangement formed on said pair of substrates; and
a ferroelectric liquid crystal layer interposed between said substrates wherein molecules of said ferroelectric liquid crystal layer are capable of being switched between two stable states via an intermediate state in accordance with an electric field applied thereto, wherein said predetermined distance is selected in order that said ferroelectric liquid crystal layer does not form helices when the molecules take said two stable states but forms helices during said intermediate state.

7. A liquid crystal electro-optical device as in claim 6, wherein said predetermined distance is substantially larger than a distance of a pitch of said helices and not less than five times the distance of said pitch.

8. A liquid crystal electro-optical device comprising:
a pair of substrates spaced apart from each other;
an electrode arrangement formed on said pair of substrates; and
a ferroelectric liquid crystal layer interposed between said substrate wherein molecules of said ferroelectric liquid crystal layer are capable of being switched between two stable states via an intermediate state in accordance with an electric field applied thereto, wherein said ferroelectric liquid crystal layer does not form helices when the molecules take said two stable states but forms helices during said intermediate state and wherein said liquid crystal layer comprises a blended liquid crystal material which includes at least one liquid crystal material represented by the general formula:

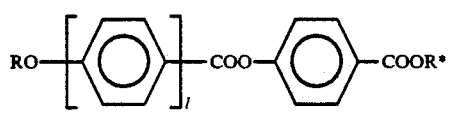

where R stands for an alkyl group comprised of 6-12 carbon constituent atoms; R* stands for an optically active group comprised of 9-15 carbon constituent atoms including at least one asymmetric carbon atom; and 1 represents a numeral 1 or 2.

9. A liquid crystal electro-optical liquid crystal electro-optical device as in claim 8, wherein said R, l and R* are as follows:

| R | l | R* |
|---|---|---|
| $C_8H_{17}$ | 1 | 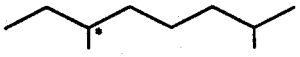 |
| $C_{12}H_{25}$ | 1 | 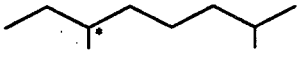 |
| $C_{10}H_{21}$ | 2 | 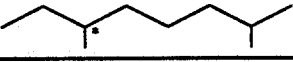 |

10. A liquid crystal electro-optical device comprising:
a pair of substrates spaced apart from each other;
an electrode arrangement formed on said pair of substrates; and
a ferroelectric liquid crystal layer interposed between said substrates wherein molecules of said ferroelectric liquid crystal layer are capable of being switched between two stable states via an intermediate state in accordance with an electric field applied thereto, wherein said ferroelectric liquid crystal layer does not form helices when the molecules take said two stable states but forms helices during said intermediate state and wherein said liquid crystal layer comprises a blended liquid crystal material which includes at least one liquid crystal material represented by the general formula:

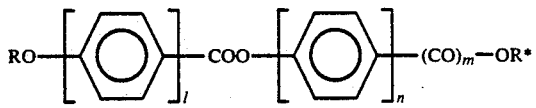

where R stands for an alkyl group comprised of 6-12 carbon constituent atoms; R* stands for an optically active group comprised of 9-15 carbon constituent atoms including at least one asymmetric carbon atom; and l, m and n represent a numeral, respectively.

11. A liquid crystal electro-optical device as in claim 10 wherein said R, l, n, m and R* are as follows:

| R | l | n | m | R* |
|---|---|---|---|---|
| $C_8H_{17}$ | 1 | 1 | 0 |  |
| $C_9H_{19}$ | 1 | 1 | 1 | 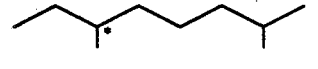 |
| $C_{12}H_{25}$ | 2 | 1 | 1 | 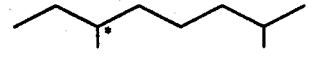 |
| $C_{10}H_{21}$ | 2 | 1 | 1 | 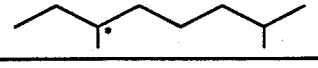 |

* * * * *